Figures 1, 2:
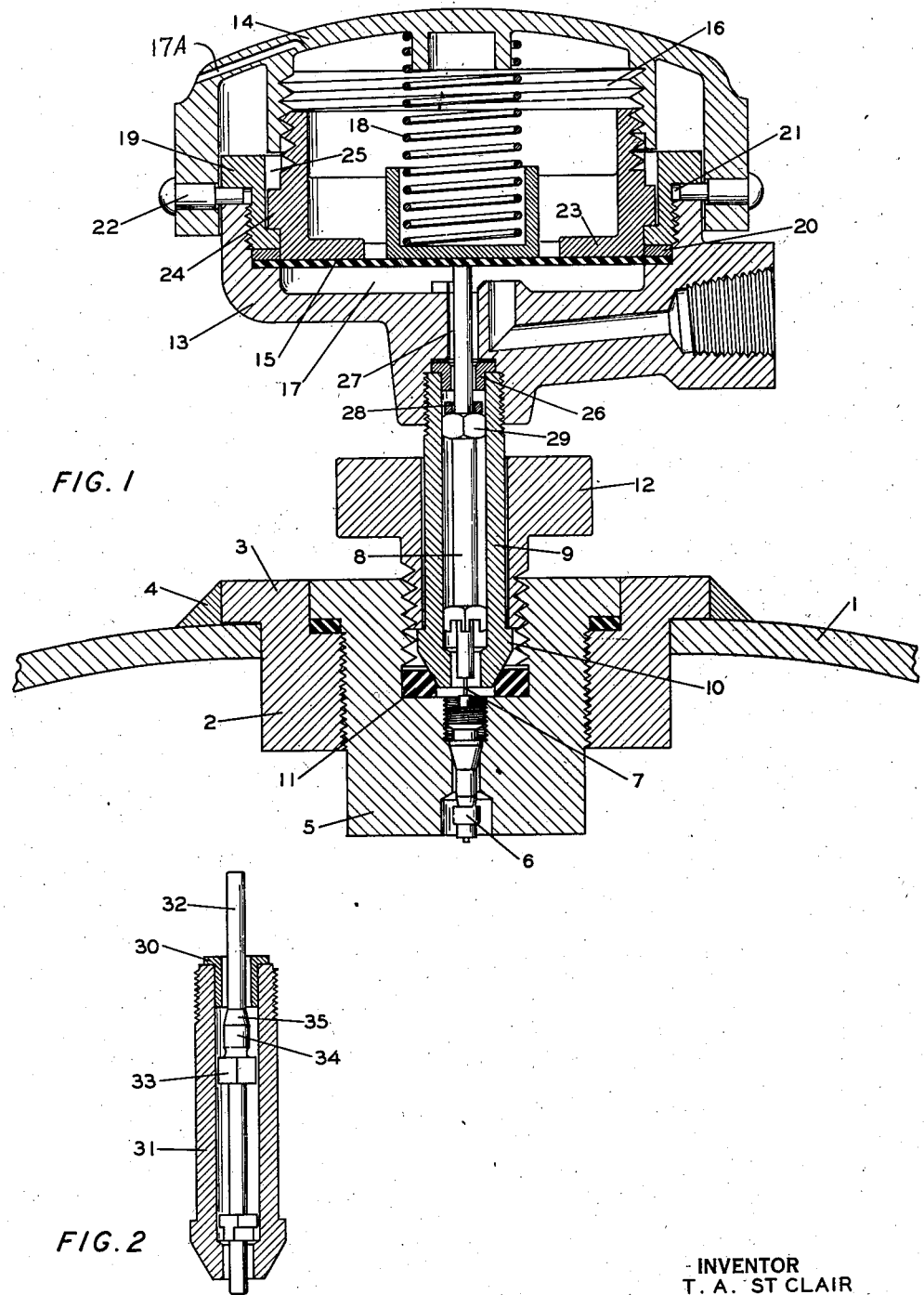

July 25, 1944.      T. A. ST. CLAIR      2,354,283
ANTIBUZZ FLUID PRESSURE REGULATOR
Filed Aug. 4, 1941

INVENTOR
T. A. ST CLAIR
BY
ATTORNEY

Patented July 25, 1944

2,354,283

UNITED STATES PATENT OFFICE 2,354,283

ANTIBUZZ FLUID PRESSURE REGULATOR

Theodore A. St. Clair, Pontiac, Mich., assignor to Phillips Petroleum Company, a corporation of Delaware Application August 4, 1941, Serial No. 405,438

3 Claims. (Cl. 50—21)

The present invention relates to fluid pressure regulators of the type shown and described in the T. A. St. Clair Patent No. 2,271,278, issued January 27, 1942. The operation of regulators of the type disclosed in the St. Clair patent is substantially the same as that of the pressure regulator described and claimed in the Lewis Patent No. 2,245,485 of June 10, 1941, which are adapted to be used in connection with systems for dispensing liquefied petroleum gas such as shown in the R. W. Thomas application Serial No. 281,969, filed June 29, 1939.

In the operation of systems adapted for the dispensing of liquefied petroleum gases, two storage tanks are ordinarily employed each of which is provided with a pressure regulator so connected in the system that upon exhaustion of one of the tanks gas flow will automatically be established to the service line from the other tank. The regulator which is the subject matter of the St. Clair patent provides an arrangement for automatically shutting off the flow of gas when the pressure in the tank falls below a certain point thereby preventing loss of gas on reversal of flow. This arrangement consists of a fluid pressure responsive diaphragm which is spring loaded in such a manner that on disconnection from the storage tank, the diaphragm will be forced downwardly to engage the valve seat and close the outlet conduit to the service line.

Fluid pressure regulators of the above mentioned type are provided with means for regulating fluid flow from the tank to the diaphragm which include a conduit connecting the tank to a fluid compartment on the lower side of the diaphragm and a core valve in the conduit remote from the diaphragm for controlling fluid pressure flow through the conduit to the bottom of the diaphragm. The arrangement also includes a force transmitting element or push pin extending into the conduit from the diaphragm to the valve which is responsive to diaphragm movement to control the opening of the valve and spaced from the inside of the conduit by guides so as to provide a passage for fluid flow.

A principal difficulty encountered in the operation of pressure regulators as above described is a pronounced buzzing tendency to occur in the connection between the fluid pressure storage tank and the bottom of the diaphragm. This buzzing is due to vibration of the push pin relative to the inside of the conduit and between the diaphragm and the valve core, and has proven to be very objectionable in the operation of such systems. The apparatus for dispensing liquefied petroleum gases is ordinarily located in the immediate vicinity of the building and, therefore, quietness of operation is an essential requirement in such systems. Sounds incident to the operation of the regulator are carried to the interior of the building through the medium of the installation piping. The consumption of the gaseous fuel is not constant and sudden changes in pressure in the line and regulator cause a rapid fluctuation of the diaphragm. Vibration of the push pin has been found primarily due to the fact that the bottom of the diaphragm is directly exposed to pressure pulsations from the tank and sudden pressure change momentarily creates an unbalanced condition on the forces which control the movement of the push pin, i. e., the loading of the diaphragm and the core valve stem.

An object of this invention is to provide a means for regulating fluid flow from a high pressure fluid storage tank to the diaphragm of a pressure regulator which will be quiet and efficient in operation.

A further object of this invention is the construction of a pressure regulator in which means are provided for reducing the magnitude of pressure variation from the storage tank to the bottom of the diaphragm.

A still further object is the provision of a restriction in the passage to the bottom of a pressure regulator diaphragm which will be sufficient to prevent vibration of the valve core push pin but will provide ample flow of gas to the service line.

In accordance with the present invention, I have discovered that fluid pressure regulator operation can be materially improved and rendered substantially noiseless if means are provided in the conduit connecting such regulators to the storage tanks to reduce the effect of sudden pressure variation on diaphragm operation. It has been found in accordance with this invention that if a sufficient restriction to fluid flow is provided in the conduit, valve opening will take place gradually and vibration and relative movement of the force transmitting element eliminated. The restriction in the conduit between the diaphragm and the core valve in effect creates a chamber between the restriction and the core valve which absorbs sudden change in pressure and smooths out the flow of gas to the bottom of the diaphragm.

Referring to the drawing, in which Fig. 1 is a sectional view of the regulator; and Fig. 2 is a sectional view of a modified form of the push pin device, a fluid pressure regulator of the type disclosed in the St. Clair patent is shown. A portion of a liquefied or high pressure gas container is designated at 1 provided with an annular ring 2 and having a shoulder 3 which is attached to the high pressure container at 4. The ring 2 is tapped to receive a plug member 5 which is drilled and tapped to receive a valve 6 of the tire valve core type. The valve 6 is provided with a valve stem 7 and directly above the valve stem is a force transmitting element or push pin 8 provided with upper and lower guide nuts 29.

Concentric with the push pin 8 is a tubular conduit 9 provided at its lower end with a nipple 10 which engages a resilient sealing ring 11 in a threaded recess in the plug member 5. A fluid tight connection is maintained between the tubular conduit and the tank by means of a clamping nut 12.

A regulator housing comprising a body 13 and a cover 14 has a flexible diaphragm 15 which divides the housing into two compartments, namely, a loading compartment 16 and a fluid compartment 17 below the bottom of the diaphragm provided with an outlet conduit leading to the service line. The loading compartment 16 is vented at 17A to the atmosphere and contains an expansion spring 18 adjustably disposed between the cover 14 and the top of the diaphragm. A diaphragm retainer 19 with a threaded connection to the body 13 bears upon a diaphragm slip ring 20 which in turn clamps diaphragm 15 securely in place. The retainer 19 is so shaped as to provide a circumferential groove 21 for the reception of pins 22 allowing relative rotation between the cover 14 and regulator body 13. The loading compartment 16 is provided with a diaphragm stop 23 for limiting the effective diaphragm area which in turn will control the discharge pressure of the regulator. The diaphragm stop 23 is in threaded engagement with the interior of the cover 14 and is provided with lugs 24 which are free to move vertically in slots 25, formed in the diaphragm retainer 19 but which prevent the diaphragm stop from rotating relative to the regulator body 13. A bushing 26 is held in the lower slightly enlarged portion of the passage 27 in the regulator housing body 13 by the upper end of conduit 9 which is threaded to the interior of the passage. The lower end of the bushing 26 provides a seat for a regulator collar 28 which is slidably mounted on the push pin 8. The inside diameter of the collar is slightly greater than the outside diameter of the push pin to provide a flow way. The regulator collar 28 is moved against the seat provided on the bottom of the bushing 26 in response to fluid flow through the conduit and in this position fluid flow to the bottom of the diaphragm is restricted to the area between the inside diameter of the collar and the outside diameter of the push pin. It is thus apparent that as the regulator collar 28 is held in contact with the bushing seat 26 by the dynamic force produced by gas flow through the regulator, a constant restriction to fluid flow is formed in the flow-way provided between the internal diameter of the collar and the external diameter of the push-pin. When flow through the conduit has dropped below a predetermined point on disconnection of nipple 10 from the tank, the collar will fall to its lower position and rest on the upper guide nut 29, and in this position will allow free flow of fluid in the opposite direction in the conduit through the much greater area provided between the inside diameter of the conduit and the outside diameter of the collar to allow positive seating of the diaphragm on the outlet conduit valve seat.

A direct relationship exists between the restricted area, the chamber between the inlet valve and the restriction, the active area of the inlet valve, and the density of the fluid, the inlet pressure and the outlet flow. The inlet valve should be of sufficient size relative to the restriction to produce the desired dampening effect and allow sufficient flow. The restricted area provided on fluid flow to the bottom of the diaphragm between the collar and push pin reduces the magnitude of pressure variation on the diaphragm, thus permitting a gradual closure of the valve thereby eliminating vibration of the push pin. The flow area between the push pin and the collar is calculated to allow sufficient flow of fluid to the service line for consumption requirements and at the same time have a throttling effect on fluid flow through the conduit to the diaphragm. Thus in determining the proper area of flow at the restriction, the lower limit of flow area is established by maximum requirements in the service line, while the upper limit of flow area will be determined by the amount of throttling necessary to eliminate vibration of the push pin.

A modified form of the invention is shown in Figure 2 in which a relatively longer bushing 30 is located in the upper part of the flow conduit 31 to be clamped in position between the conduit and regulator housing. The push pin of modified form is shown at 32 provided with the usual guide nut 33 and having a section of enlarged diameter 34 and conical bevel portion 35. In response to fluid pressure on the bottom of the diaphragm a restriction in the conduit is established by the limited area between the cylindrical section 34 and the inside of the bushing 30. Under the influence of pressure cylindrical section 34 of the push pin rises into the bushing in normal regulator operation and drops free of the bushing on disconnection of the regulator, furnishing the required flow area for proper seating of the check valve. The conical portion 35 is for the purpose of providing a guide for the cylindrical section 34 so that as the regulator is being connected, there will be no catching or "hanging up" between the push pin and the bushing 30.

While I have shown and described two specific arrangements for the elimination of buzz in pressure regulators, it is obvious that various other means may be employed within the scope of the present invention.

I claim:

1. A device for the elimination of buzz in a pressure regulator comprising in combination a regulator casing, a pressure actuated diaphragm in said casing forming a compartment between the diaphragm and one side of the casing, a conduit for conducting fluid under relatively high pressure to one side of said diaphragm secured to said one side of said casing, a valve in the conduit remote from and having a stem projecting toward said diaphragm, an elongated force transmitting element mounted for lengthwise movement in said conduit and having its ends separate from and in engagement with said diaphragm and said valve stem, respectively, said force transmitting element being responsive to movement of said diaphragm and so constructed and arranged as to provide a passage for fluid flow through said conduit to said diaphragm, said conduit having a restricted portion, and means on said force transmitting element movable into cooperating relationship with said restricted portion to form a further constant substantial restriction to fluid flow through said conduit to said diaphragm to reduce the magnitude of rapid pressure variations on said diaphragm sufficiently to prevent vibration of said element in said conduit and consequent buzz caused by such vibration.

2. A device for the elimination of buzz in a pressure regulator comprising in combination a regulator casing, a pressure actuated diaphragm in said casing forming a compartment between the diaphragm and one side of the casing, a conduit for conducting fluid under relatively high pressure to one side of said diaphragm secured to said one side of said casing, a valve in the conduit remote from and having a stem projecting toward said diaphragm, an elongated force transmitting element mounted for lengthwise movement in said conduit and having its ends separate from and in engagement with said diaphragm and said valve stem, respectively, said force transmitting element being responsive to movement of said diaphragm and so constructed and arranged as to provide a passage for fluid flow through said conduit to said diaphragm, said conduit having a restricted portion, and a ring loosely slidable along said force transmitting member into sealing contact with said restricted portion to form a further constant substantial restriction to fluid flow through said conduit to said diaphragm to reduce the magnitude of rapid pressure variations on said diaphragm sufficiently to prevent vibration of said element in said conduit and consequent buzz caused by such vibration.

3. A device for the elimination of buzz in a pressure regulator comprising in combination a regulator casing, a pressure actuated diaphragm in said casing forming a compartment between the diaphragm and one side of the casing, a conduit for conducting fluid under relatively high pressure to one side of said diaphragm secured to said one side of said casing, a valve in the conduit remote from and having a stem projecting toward said diaphragm, an elongated force transmitting element mounted for lengthwise movement in said conduit and having its ends separate from and in engagement with said diaphragm and said valve stem, respectively, said force transmitting element being responsive to movement of said diaphragm and so constructed and arranged as to provide a passage for fluid flow through said conduit to said diaphragm, said conduit having a restricted portion, and a uniform diameter enlarged portion on said force transmitting element movable into cooperating relationship with said restricted portion to form a further constant substantial restriction to fluid flow through said conduit to said diaphragm to reduce the magnitude of rapid pressure variations on said diaphragm sufficiently to prevent vibration of said element in said conduit and consequent buzz caused by such vibration.

THEODORE A. ST. CLAIR.